United States Patent Office 3,498,275
Patented Mar. 3, 1970

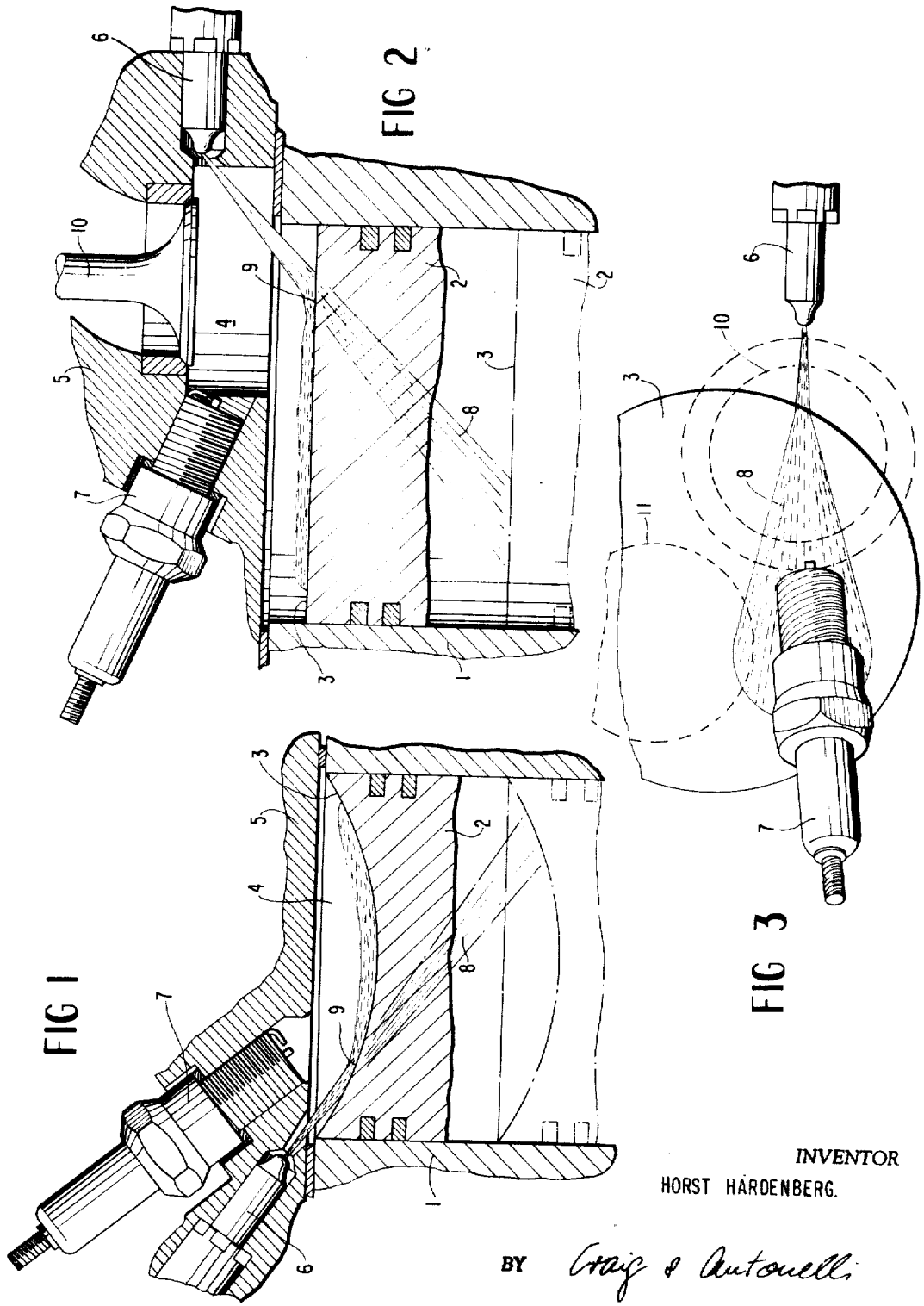

3,498,275
FUEL INJECTION TYPE ENGINE
Horst Hardenberg, Stuttgart-Unterturkheim, Germany, assignor to Daimler-Benz Aktiengesellschaft, Stuttgart-Unterturkheim, Germany
Filed Sept. 12, 1967, Ser. No. 667,265
Claims priority, application Germany, Sept. 15, 1966,
D 51,103
Int. Cl. F02b *3/04, 75/02*
U.S. Cl. 123—32  16 Claims

ABSTRACT OF THE DISCLOSURE

A process and apparatus for controlling the injection of the fuel quantity in externally controlled internal combustion engines operable with an injection beginning advanced with increases in load, in which the fuel jet, which is initially injected at least partly atomized over a free injection path of substantial length, is applied as to its rest in a film-like and reflection-free manner against the piston top from a place on the piston top remote from the ignition source to a place more close thereto.

BACKGROUND OF THE INVENTION

The present invention relates to a process for the injection of a controllable or adjustable fuel quantity into the compression stroke of an externally controlled internal combustion engine and for the mixing of the injected fuel with the combustion air whereby the beginning of the injection is advanced with increasing injection quantity, as well as to an internal combustion engine for carrying out the process.

With the direct injection of the fuel in externally controlled internal combustion engines, it is important that at the instant of the ignition, an ignitable fuel-air mixture is always present at the ignition source independently of the load and rotational speed and therewith of the injected fuel quantity. Furthermore, it is desirable that the fuel-air ratio decreases with increasing distance from the ignition source whereby analogously, the fuel-air ratio with highest load is to be uniform in the entire combustion space. An optimum maintenance of these requirements with the presently customary injection systems over the entire load range still presents difficulties.

SUMMARY OF THE INVENTION

The present invention is concerned with the task to assure the optimum possible fulfillment of the aforementioned requirements, whereby not only an always ignitable fuel mixture is to be supplied at the ignition source but additionally it is an aim of the present invention that the size of the mixture field so increases from the ignition source with increasing loads of the internal combustion engine that pure, unmixed combustion air remains only outside of the closed field. In addition to a good and rapid burning of the cylinder charge as small as possible a discharge or exhaust of unburned hydrocarbons is to be achieved thereby since the quantity thereof is proportional to the combustion space surface acted upon by the combustion, whence it is desirable that the combustion takes place within as small as possible a part of the combustion space.

The underlying problems are solved in accordance with the present invention in that the fuel injected at first partly atomized in a conventional manner along a non-too-short, free jet path, is subsequently applied with its rest in a film-like and reflection-free manner on the piston top, possibly forming at the same time the combustion space, from a place more remote with respect to the ignition source toward a place more close to the ignition source.

With such an injection process, in which the injection with smaller loads begins later, also the first point of impact of the fuel on the piston top approaches more closely the ignition source with smaller loads so that it remains assured that an ignitable mixture is always present at the ignition source and notwithstanding this feature, no unnecessarily wide expansion of the mixture field, properly speaking, can take place. Whereas with maximum loads of the internal combustion engine, a far-reaching atomization of the injected fuel and a corresponding homogenization of the cylinder charge is desirable, the proportion of the atomized or injected fuel is also reduced with smaller loads because of the shorter injection period and the smaller injection quantity as well as also because of the smaller length of the free injection path due to the later beginning of the injection, which prevents advantageously the homogenization of the cylinder charge that becomes undesirable with smaller loads.

According to a preferred realization of the process according to the present invention, the application of the non-atomized fuel component takes place with maximum load and corresponding largest injection quantity over a length that corresponds at least to one-half the piston diameter.

According to a further feature of the present invention, the combustion air is supplied into the working cylinder, in any conventional manner, rotating or swirling about the cylinder axis or the combustion space axis, whereby the re-detachment of the fuel applied to the piston surface as fuel vapor and the mixing and combustion thereof with the combustion air is accelerated.

Accordingly, it is an object of the present invention to provide a process and apparatus for the injection of controllable fuel quantities in externally controlled internal combustion engines which eliminate by simple and effective means the aforementioned shortcomings and drawbacks encountered in the prior art.

Another object of the present invention resides in a process and apparatus for injecting a controllable fuel quantity in externally controlled internal combustion engines which assures the presence of an ignitable fuel-air mixture at all times within the area of the ignition source.

A further object of the present invention resides in a process and apparatus of the type described above which produces a decrease of the fuel-air ratio with increasing distance from the ignition source while at the same time assuring uniformity of the fuel-air ratio over the entire combustion space under maximum load conditions.

Still a further object of the present invention resides in a process and apparatus for controlling the injection of the fuel quantity in externally controlled internal combustion engines in which optimum conditions as regards combustion can be maintained by simple means.

Still another object of the present invention resides in a process and apparatus for controlling the injection of the fuel quantity in externally controlled internal combustion engines which assures an increase in the size of the mixing field with increasing loads of the internal combustion engine in such a manner that pure, unmixed combustion air remains on the outside of this substantially closed field.

A further object of the present invention resides in a process and apparatus of the aforementioned type which achieves as small as possible a discharge of unburned hydrocarbons.

Still a further object of the present invention resides in a process and apparatus for controlling the injection in externally controlled internal combustion engines which assures homogenization of the cylinder charge during maximum loads but prevents homogenization of the cylinder charge during smaller loads.

These and other objects, features and advantages of the present invention will become more obvious from the following description when taken in connection with the accompanying drawing which shows, for purposes of illustration only, two embodiments in accordance with the present invention, and wherein:

FIGURE 1 is a schematic partial axial cross-sectional view through the working cylinder of an internal combustion engine suitable for the realization of the process according to the present invention;

FIGURE 2 is a schematic partial axial cross-sectional view through the working cylinder of a second embodiment of an internal combustion engine for the realization of the process according to the present invention; and FIGURE 3 is a schematic plan view on the injection arrangement of FIGURE 2.

Referring now to the drawing wherein like reference numerals are used throughout the various views to designate like parts, and more particularly to FIGURE 1, the internal combustion engine illustrated therein includes a piston 2 within its working cylinder 1 which forms nearly the entire combustion space 4 of the working cylinder 1 in an axial, spherically curved piston recess extending over the entire piston top 3. A fuel injection nozzle 6 is arranged in the cylinder head 5 of the internal combustion engine at an edge place of the working cylinder 1 and closely above the same is arranged a spark plug 7.

During operation of the described internal combustion engine, the injection nozzle 6 begins to inject under maximum load when the piston 2 is in the lower position indicated in FIGURE 1 by reference numeral 2a and shown in dash and dot line, so that the non-atomized portion of the fuel jet 8 initially impinges against the edge area of the piston top 3 disposed opposite the injection nozzle 6 whereas during the continuing injection and simultaneous further upward movement of the piston 2, the fuel is applied diametrically over the entire piston top 3 as is illustrated in connection with the piston 2 disposed in its upper position in FIGURE 1. As a result of the kinetic energy of the jet 8, the applied fuel expands in a filmlike manner over a large part of the piston top 3 to both sides of the jet direction, properly speaking. The injection thereby terminates approximately in the upper position of the piston 2 visible from FIGURE 1, whereby the place of impingement 9 of the last-injected fuel lies approximately below the spark plug 7.

With a decreasing load of the internal combustion engine, the injection nozzle 6 also begins to inject later so that solely the length of the fuel film applied to the piston top 3 is correspondingly shortened whereas the impact place 9 of the last-injected fuel and the associated position of the piston 2 remain preserved, i.e., remain the same. It is assured thereby that at the instant of ignition a sufficiently rich, ignitable mixture is always present in direct proximity of the spark plug 7 independently of the load of the internal combustion engine.

With the internal combustion engine corresponding to the second embodiment illustrated in FIGURES 2 and 3 in which the same parts are designated with the same reference numerals as in FIGURE 1, the combustion space 4' essentially consists of a cylindrical recess below a valve 10 arranged recessed in the cylinder head 5; the injection nozzle 6 is arranged at the edge place of the cylindrical combustion space recess 4' approximately opposite the piston center while the spark plug 7 is arranged at an edge place disposed approximately opposite the first edge place and simultaneously adjacent a second valve 11. The injection and application of the non-atomized portion of the fuel jet 8 against the piston top 3 takes place, in principle, in the same manner as with the first embodiment and is believed not to require any repetitious explanation in view of the illustration of FIGURES 2 and 3. It is to be noted only that the film-like expansion of the fuel and the re-detachment thereof from the piston bottom 3 as fuel vapor is assisted in an advantageous manner by the squeeze flow of the air displaced between the piston 2 and the cylinder head 5.

While I have shown and described two embodiments in accordance with the present invention, it is understood that the same is not limited thereto but is susceptible of numerous changes and modifications as known to a person skilled in the art. Instead of a spark plug, for example, also a glow plug may be provided as ignition source, and the combustion air, for the purpose of further improvement of the mixture preparation and especially the re-detachment of the applied fuel from the piston top 3 as fuel vapor, may also be supplied to the working cylinder rotating or swirling about the cylinder axis or the combustion space axis in any known, conventional manner without in any way effecting the scope of the present invention. Consequently, I do not wish to be limited to the details shown and described herein, but intend to cover all such changes and modifications as are within the scope of those skilled in the art.

I claim:

1. An externally controlled internal combustion engine exclusively of the injection type with an injection of an adjustable fuel quantity from an injection nozzle into its combustion chamber during the compression stroke which includes a cylinder accommodating a piston, means for initiating the injection earlier during the compression stroke as the quantity of fuel in each charge is increased and means for terminating the injection substantially at a moment approximately corresponding to the compression top dead center position of the piston, wherein the improvement comprises means located to one side of the cylinder axis for initially injecting fuel by the same injection nozzle over a free jet path into the cylinder in a direction toward the opposite side of the cylinder axis in such a manner that the remaining fuel portion which does not atomize along the free jet path is applied by the same injection nozzle obliquely onto the piston top at such constant angle as to be substantially reflection-free, and that the center of the area of impact of said remaining fuel portion moves during the injection period across the piston top from a place on the piston top remote from an ignition source toward a place more close thereto and in a direction from said opposite side of the cylinder axis to said one side thereof.

2. An internal combustion engine with a cylinder head according to claim 1, characterized in that said ignition source and injection means are located in the cylinder head, and in that the ignition source is located on said one side of the cylinder axis.

3. An internal combustion engine according to claim 2, characterized in that said combustion chamber is constituted at least to a substantial extent by a recess in the piston top.

4. An internal combustion engine with a cylinder head according to claim 1, characterized in that said ignition source and injection means are located in the cylinder head, and in that the ignition source is located within the area of the cylinder axis.

5. An internal combustion engine according to claim 4, characterized in that the combustion chamber is formed at least to a substantial extent by a recess in the cylinder head.

6. An internal combustion engine according to claim 1, wherein the combustion space is formed by an axial, spherically curved piston recess extending over the entire piston top, and wherein the ignition source is arranged in the cylinder head of the engine in proximity to the injection nozzle.

7. An internal combustion engine according to claim 1, wherein the combustion space essentially consists of a cylindrical recess below a valve arranged recessed in the cylinder head, the injection nozzle being arranged at an edge place of the cylindrical combustion space recess approximately opposite the piston center and the ignition source being arranged at an edge place of the combustion space recess approximately opposite the injection nozzle and simultaneously approximately adjacent a second valve.

8. An internal combustion engine according to claim 1, wherein the combustion space is formed at least to a considerable part by the piston top.

9. An internal combustion engine according to claim 8, wherein the application of the non-atomized fuel portion against the piston top under maximum load takes place over a length which corresponds to at least approximately half the piston diameter.

10. An internal combustion engine according to claim 9, further comprising means for supplying combustion air to the combustion space so as to rotate about an axis, extending generally in the direction of rotation of the combustion space axis.

11. An externally controlled internal combustion engine exclusively of the injection type with injection of an adjustable fuel quantity into its combustion chamber during the compression stroke, with means for initiating injection earlier during the compression stroke as the quantity of fuel in each charge injected is increased and which includes at least one cylinder, a piston in the cylinder, a combustion space, a single injection nozzle, and an externally controlled ignition source, wherein the improvement comprises means for injecting the fuel by said single injection nozzle into the cylinder from a place located to one side of the cylinder axis and in a jet stream mainly directed toward the opposite side thereof and obliquely onto the surface of the piston top at such angle as to be substantially reflection-free and in such a manner that the place of impact of the fuel jet moves during the injection period laterally in a path across the piston top from a place on the piston top remote from the ignition source toward a place more close thereto as the length of the jet in effect decreases with piston movement, and means for terminating the fuel injection under all operating conditions near the compression dead center position of the piston.

12. An internal combustion engine according to claim 11, wherein the combustion space is substantially formed by the piston top.

13. An internal combustion engine according to claim 12, further comprising means for supplying combustion air to the combustion space so as to rotate about the axis thereof.

14. An internal combustion engine according to claim 11, further comprising means for supplying combustion air to the combustion space so as to rotate about the axis thereof.

15. An internal combustion engine according to claim 11, wherein the application of the non-atomized fuel portion against the piston top under maximum load takes place over a length which corresponds to at least approximately half the piston diameter.

16. An internal combustion engine according to claim 11, wherein the fuel is injected initially at least partly atomized of a free path of substantial length.

References Cited

UNITED STATES PATENTS

| | | | |
|---|---|---|---|
| 3,195,520 | 7/1965 | Simko | 123—32 |
| 2,916,023 | 12/1959 | Sanborn | 123—32 |
| 3,079,901 | 3/1963 | Hallberg | 123—32 |
| 3,107,658 | 10/1963 | Meurer | 123—32 |

LAURENCE M. GOODRIDGE, Primary Examiner

U.S. Cl. X.R.

123—75